US012748906B2

(12) United States Patent
Liu et al.

(10) Patent No.: US 12,748,906 B2
(45) Date of Patent: Sep. 29, 2026

(54) METHOD AND DEVICE FOR DESIGNING PIXEL CIRCUIT, CONTROLLER, AND STORAGE MEDIUM

(71) Applicant: SHENZHEN CHINA STAR OPTOELECTRONICS SEMICONDUCTOR DISPLAY TECHNOLOGY CO., LTD., Shenzhen (CN)

(72) Inventors: Siyang Liu, Shenzhen (CN); Zui Wang, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 651 days.

(21) Appl. No.: 17/427,552

(22) PCT Filed: Jul. 19, 2021

(86) PCT No.: PCT/CN2021/107176
§ 371 (c)(1),
(2) Date: Jul. 30, 2023

(87) PCT Pub. No.: WO2023/272806
PCT Pub. Date: Jan. 5, 2023

(65) Prior Publication Data

US 2024/0184970 A1 Jun. 6, 2024

(30) Foreign Application Priority Data

Jun. 28, 2021 (CN) ......................... 202110717291.6

(51) Int. Cl.
*G06F 30/392* (2020.01)
*G06F 30/3947* (2020.01)
(Continued)

(52) U.S. Cl.
CPC ........ *G06F 30/392* (2020.01); *G06F 30/3947* (2020.01); *G06F 30/3953* (2020.01); *G06F 2111/20* (2020.01)

(58) Field of Classification Search
CPC ............... G06F 30/392; G06F 30/3947; G06F 30/3953; G06F 2111/20
(Continued)

(56) References Cited

U.S. PATENT DOCUMENTS 7,176,861 B2 * 2/2007 Dedene ................ H10K 59/353 345/83
9,817,935 B2 * 11/2017 Eldesouki ............. H04N 25/46
(Continued)

FOREIGN PATENT DOCUMENTS

CN 103713436 A 4/2014
CN 107391782 A 11/2017
(Continued)

OTHER PUBLICATIONS

Chinese Office Action issued in corresponding Chinese Patent Application No. 202110717291.6 dated Jul. 20, 2023, pp. 1-8.
(Continued)

*Primary Examiner* — Suchin Parihar
(74) *Attorney, Agent, or Firm* — PV IP PC; Wei Te Chung

(57) ABSTRACT

The present application provides a method and a device for designing a pixel circuit, a controller, and a storage medium. The method includes: calling size information of a standard panel and characteristic label information of a plurality of standard devices, and combining with an architecture type identifier acquired to determine characteristic label information of at least one target device, in order to further determine a target pixel circuit to generate a target pixel circuit matrix comprising a plurality of the target pixel circuits.

15 Claims, 3 Drawing Sheets

(51) Int. Cl.
*G06F 30/3953* (2020.01)
*G06F 111/20* (2020.01)

(58) Field of Classification Search
USPC .......................................................... 716/122
See application file for complete search history.

(56) References Cited

U.S. PATENT DOCUMENTS

| | | | | |
|---|---|---|---|---|
| 12,372,864 | B2 * | 7/2025 | Fujimura | G03F 1/36 |
| 2002/0029371 | A1 | 3/2002 | Hwang et al. | |
| 2011/0186333 | A1 | 8/2011 | Wang et al. | |
| 2015/0035448 | A1 * | 2/2015 | Wang | G09G 3/3291 315/240 |
| 2016/0180005 | A1 | 6/2016 | Liu et al. | |
| 2022/0328597 | A1 * | 10/2022 | Huang | H10K 59/1213 |

FOREIGN PATENT DOCUMENTS

| | | | |
|---|---|---|---|
| CN | 109543300 | A | 3/2019 |
| CN | 111679474 | A | 9/2020 |
| CN | 111883066 | A | 11/2020 |
| CN | 112417805 | A | 2/2021 |

OTHER PUBLICATIONS

International Search Report in International application No. PCT/CN2021/107176, mailed on Mar. 29, 2022.
Written Opinion of the International Search Authority in International application No. PCT/CN2021/107176, mailed on Mar. 29, 2022.

* cited by examiner

METHOD AND DEVICE FOR DESIGNING PIXEL CIRCUIT, CONTROLLER, AND STORAGE MEDIUM

RELATED APPLICATIONS

This application is a Notional Phase of PCT Patent Application No. PCT/CN2021/107176 having international filing date of Jul. 19, 2021, which claims the benefit of priority of Chinese Patent Application No. 202110717291.6 filed on Jun. 28, 2021. The contents of the above applications are all incorporated by reference as if fully set forth herein in their entirety.

BACKGROUND OF INVENTION

Field of Invention

The present disclosure relates to the field of display technology, in particular to a method and a device for designing a pixel circuit, a controller, and a storage medium.

Description of Prior Art

Currently, when drawing a pixel circuit of a display panel, manual inputs of a corresponding set of parameters to a system are needed, and the system then draws a corresponding pixel circuit according to the corresponding set of parameters. In this way, when drawing pixel circuits of display panels of different sizes, a plurality of sets of parameters corresponding to the display panels of multiple sizes are needed to be input to the system for drawing, respectively, which leads to extremely high labor costs, and due to limited manual data input speed, drawing efficiency of the pixel circuit of the display panel is extremely low.

Therefore, it is necessary to provide a method and a device for designing a pixel circuit, a controller, and a storage medium, that can reduce labor costs and improve the drawing efficiency of the pixel circuit.

SUMMARY OF INVENTION

Embodiments of the present disclosure provide a method and a device for designing a pixel circuit, a controller, and a storage medium to solve an existing technical problem that drawing efficiency of a pixel circuit of a display panel is extremely low due to determining pixel circuits in panels of different sizes through a manual data input manner of limited speed.

An embodiment of the present disclosure provides a method for designing a pixel circuit, which comprises:

acquiring layout information of a target panel, wherein the layout information comprises size information and an architecture type identifier of the target panel;

calling a standard database, wherein the standard database stores size information of a standard panel and characteristic label information of a plurality of standard devices;

determining characteristic label information of at least one target device based on the size information of the target panel according to the size information of the standard panel and the characteristic label information of at least one of the standard devices;

determining a target pixel circuit according to the characteristic label information of the at least one target device and the architecture type identifier; and generating a target pixel circuit matrix according to the size information of the target panel and the target pixel circuit, wherein the target pixel circuit matrix comprises a plurality of target pixel circuits.

In an embodiment, the step of determining the characteristic label information of the at least one target device based on the size information of the target panel according to the size information of the standard panel and the characteristic label information of the at least one of the standard devices comprises:

determining characteristic label information of at least one reference device from the characteristic label information of the plurality of standard devices according to the architecture type identifier; and determining the characteristic label information of the at least one target device based on the size information of the target panel according to the size information of the standard panel and the characteristic label information of the at least one reference device.

In an embodiment, the characteristic label information of the standard devices comprises size information of the standard devices, the size information of the standard devices comprises size information of the reference device, the characteristic label information of the target device comprises size information of the target device, and the size information of the reference device is configured to determine the size information of the target device.

In an embodiment, size information of the plurality of reference devices comprises M1 Gate width, M2 Data width, and ITO Cst width;

wherein a pixel circuit of the standard panel comprises a plurality of gate lines arranged in parallel, a plurality of data lines arranged in parallel, and a plurality of common electrodes of an array substrate, the plurality of gate lines and the plurality of data lines cross each other to define a plurality of pixel regions, and each of the pixel regions is used to set a corresponding pixel circuit and a corresponding common electrode of the array substrate, and each common electrode of the array substrate overlaps a corresponding pixel electrode to form a storage capacitor, wherein the M1 Gate width is a width value of the gate line, the M2 Data width is a width value of the data line, and the ITO Cst width is a width value of an overlapping area corresponding to the storage capacitor.

In an embodiment, the target pixel circuit comprises a plurality of target devices, and the plurality of target devices comprise a first target device and a second target device; and the step of determining the characteristic label information of the at least one target device based on the size information and the architecture type identifier of the target panel according to the size information of the standard panel and the characteristic label information of the at least one of the standard devices comprises:

determining size information of the first target device based on the size information of the target panel according to the size information of the standard panel and the size information of one reference device; and determining size information of the second target device according to the size information of the first target device based on a preset rule.

In an embodiment, in the second target device and the first target device, preset rules of size information of different parts are the same or different.

In an embodiment, the target pixel circuit further comprises at least one fixing device, and the step of determining the target pixel circuit according to the characteristic label information of the at least one target device and the architecture type identifier comprises:

determining characteristic label information of the at least one fixing device from the characteristic label information of the plurality of standard devices according to the architecture type identifier; and determining the target pixel circuit according to the characteristic label information of a plurality of target devices, the architecture type identifier, and the characteristic label information of the at least one fixing device.

In an embodiment, the characteristic label information of a plurality of fixing devices comprises M1 ACOM width, M1 ACOM to Gate space, M2 TFT channel length, Share bar width, VIA size, ITO line & space;

wherein a pixel circuit of the standard panel comprises a plurality of gate lines arranged in parallel, a plurality of data lines arranged in parallel, and a plurality of common electrodes of an array substrate, the plurality of gate lines and the plurality of data lines cross each other to define a plurality of pixel regions, each of the pixel regions is used to provide a corresponding pixel circuit and a corresponding common electrode of the array substrate, each of the pixel regions may comprise at least one thin film transistor, and each of the common electrodes of the array substrate and a corresponding pixel electrode overlap to form a storage capacitor, wherein the M1 ACOM width is a width of the common electrode of the array substrate, and the M1 ACOM to Gate space is an interval between the common electrode of the array substrate and a corresponding gate line, the M2 TFT channel length is a channel width of the thin film transistor, the Share bar width is a width of a shared line, and the VIA size is a length and width of a via hole, and the ITO line & space is an interval between a plurality of sub-pixel electrodes in the pixel electrode.

An embodiment of the present disclosure provides a device for designing a pixel circuit, which comprises:

an acquiring module configured to acquire layout information of a target panel, wherein the layout information comprises size information and an architecture type identifier of the target panel;

a calling module configured to call a standard database, wherein the standard database stores size information of a standard panel and characteristic label information of a plurality of standard devices;

a first determining module configured to determine characteristic label information of at least one target device based on the size information and the architecture type identifier of the target panel according to the size information of the standard panel and the characteristic label information of at least one of the standard devices; and a second determining module configured to determine a target pixel circuit according to the characteristic label information of the at least one target device and the architecture type identifier; and a generating module configured to generate a target pixel circuit matrix according to the size information of the target panel and the target pixel circuit, wherein the target pixel circuit matrix comprises a plurality of target pixel circuits.

In an embodiment, the first determining module comprises:

a first sub-determining module configured to determine characteristic label information of at least one reference device from the characteristic label information of the plurality of standard devices according to the architecture type identifier; and a second sub-determining module configured to determine the characteristic label information of the at least one target device based on the size information of the target panel according to the size information of the standard panel and the characteristic label information of the at least one reference device.

In an embodiment, the characteristic label information of the standard devices comprises size information of the standard devices, and the size information of the standard devices comprises the size information of the reference device, the characteristic label information of the target device comprises size information of the target device, and the size information of the reference device is used to determine the size information of the target device, and wherein the first determining module further comprises:

a third sub-determining module configured to determine the size information of the at least one reference device from the size information of the plurality of standard devices according to the architecture type identifier;

a fourth sub-determining module configured to determine the size information of the at least one target device based on the size information and the architecture identifier of the target panel according to the size information of the standard panel and the size information of the at least one reference device.

An embodiment of the present disclosure provides a controller, wherein the controller is configured to execute a number of instructions stored in a memory to implement a method for designing a pixel circuit, and the method comprises:

acquiring layout information of a target panel, wherein the layout information comprises size information and an architecture type identifier of the target panel;

calling a standard database, wherein the standard database stores size information of a standard panel and characteristic label information of a plurality of standard devices;

determining characteristic label information of at least one target device based on the size information of the target panel according to the size information of the standard panel and the characteristic label information of at least one of the standard devices;

determining a target pixel circuit according to the characteristic label information of the at least one target device and the architecture type identifier; and generating a target pixel circuit matrix according to the size information of the target panel and the target pixel circuit, wherein the target pixel circuit matrix comprises a plurality of target pixel circuits.

In an embodiment, the step of determining the characteristic label information of the at least one target device based on the size information of the target panel according to the size information of the standard panel and the characteristic label information of the at least one of the standard devices comprises:

determining characteristic label information of at least one reference device from the characteristic label information of the plurality of standard devices according to the architecture type identifier; and determining the characteristic label information of the at least one target device based on the size information of the target panel according to the size information of the standard panel and the characteristic label information of the at least one reference device.

In an embodiment, the characteristic label information of the standard devices comprises size information of the standard devices, the size information of the standard devices comprises size information of the reference device, the characteristic label information of the target device comprises size information of the target device, and the size information of the reference device is configured to determine the size information of the target device.

In an embodiment, the target pixel circuit comprises a plurality of target devices, and the plurality of target devices comprise a first target device and a second target device; and the step of determining the characteristic label information of the at least one target device based on the size information and the architecture type identifier of the target panel according to the size information of the standard panel and the characteristic label information of the at least one of the standard devices comprises:

determining size information of the first target device based on the size information of the target panel according to the size information of the standard panel and the size information of one reference device; and determining size information of the second target device according to the size information of the first target device based on a preset rule.

An embodiment of the present disclosure provides a storage medium, wherein a number of instructions are stored in the storage medium, and the instructions are used for executing by a controller to implement a method for designing a pixel circuit, and the method comprises:

acquiring layout information of a target panel, wherein the layout information comprises size information and an architecture type identifier of the target panel;

calling a standard database, wherein the standard database stores size information of a standard panel and characteristic label information of a plurality of standard devices;

determining characteristic label information of at least one target device based on the size information of the target panel according to the size information of the standard panel and the characteristic label information of at least one of the standard devices;

determining a target pixel circuit according to the characteristic label information of the at least one target device and the architecture type identifier; and generating a target pixel circuit matrix according to the size information of the target panel and the target pixel circuit, wherein the target pixel circuit matrix comprises a plurality of target pixel circuits.

In an embodiment, the step of determining the characteristic label information of the at least one target device based on the size information of the target panel according to the size information of the standard panel and the characteristic label information of the at least one of the standard devices comprises:

determining characteristic label information of at least one reference device from the characteristic label information of the plurality of standard devices according to the architecture type identifier; and determining the characteristic label information of the at least one target device based on the size information of the target panel according to the size information of the standard panel and the characteristic label information of the at least one reference device.

In an embodiment, the characteristic label information of the standard devices comprises size information of the standard devices, the size information of the standard devices comprises size information of the reference device, the characteristic label information of the target device comprises size information of the target device, and the size information of the reference device is configured to determine the size information of the target device.

In an embodiment, the target pixel circuit comprises a plurality of target devices, and the plurality of target devices comprise a first target device and a second target device; and the step of determining the characteristic label information of the at least one target device based on the size information and the architecture type identifier of the target panel according to the size information of the standard panel and the characteristic label information of the at least one of the standard devices comprises:

determining size information of the first target device based on the size information of the target panel according to the size information of the standard panel and the size information of one reference device; and determining size information of the second target device according to the size information of the first target device based on a preset rule.

In an embodiment, the target pixel circuit further comprises at least one fixing device, and the step of determining the target pixel circuit according to the characteristic label information of the at least one target device and the architecture type identifier comprises:

determining characteristic label information of the at least one fixing device from the characteristic label information of the plurality of standard devices according to the architecture type identifier; and determining the target pixel circuit according to the characteristic label information of a plurality of target devices, the architecture type identifier, and the characteristic label information of the at least one fixing device.

The present disclosure provides a method and a device for designing a pixel circuit, a controller, and a storage medium. The method for designing the pixel circuit comprises: acquiring the layout information of the target panel, wherein the layout panel comprises the size information and the architecture type identifier of the target panel; calling the standard database, wherein the standard database stores the size information of the standard panel and the characteristic label information of the plurality of standard devices; determining the characteristic label information of at least one of the target devices based on the size information and architecture type identifier of the target panel according to the size information of the standard panel and the characteristic label information of the at least one standard device; determining the target pixel circuit according to the characteristic label information of the at least one of the target devices and the architecture type identifier; and generating the pixel circuit matrix according to the size information of the target panel and the target pixel circuit, wherein the target pixel circuit matrix comprises the plurality of target pixel circuits. This method can call the size information of the standard panel and the characteristic label information of the at least one standard device in the standard database according to the layout information of the target panel, and determine the characteristic label information of the plurality of target devices based on the size information and the architecture type identifier of the target panel to determine the target pixel circuit, which prevents acquiring information such as the size information and the location information of all devices in the target pixel circuit of the target panel to determine the target pixel circuit, and also prevents manually inputting data to determine the target pixel circuit. Rather, the target pixel circuit is determined directly based on the layout information of the target panel and the relevant information in the standard database, which improves the drawing efficiency of the pixel circuit of the display panel.

DESCRIPTION OF DRAWINGS

Technical solutions and other beneficial effects of the present disclosure will be made obvious by describing embodiments of the present disclosure in detail below in conjunction with the accompanying drawings.

DETAILED DESCRIPTION OF EMBODIMENTS

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

Terms "first" and "second" in the present disclosure are used to distinguish different objects, rather than to describe a specific order. In addition, terms "including" and "having" and any variations thereof are intended to cover non-exclusive inclusions. For example, a process, a method, a system, a product, or a device that includes a series of steps or modules is not limited to listed steps or modules, but optionally includes unlisted steps or modules, or optionally also includes other steps or modules inherent to these processes, methods, products or equipment.

Reference to "embodiments" herein means that a specific feature, structure, or characteristic described in conjunction with the embodiments may be included in at least one embodiment of the present disclosure. The appearance of the phrase in various places in the specification does not necessarily refer to the same embodiment, nor is it an independent or alternative embodiment mutually exclusive with other embodiments. Those skilled in the art clearly and implicitly understand that the embodiments described herein can be combined with other embodiments.

An execution subject of a method for designing a pixel circuit provided by an embodiment of the present disclosure may be a device for designing the pixel circuit provided by the embodiment of the present disclosure, or an electronic device integrated with the device for designing the pixel circuit. The device for designing the pixel circuit may be implemented in hardware or software.

Embodiments of the present disclosure provide a method and a device for designing a pixel circuit, a controller, and a storage medium. The detailed description will be given below.

Hereinafter, each step of the method for designing the pixel circuit of the embodiment of the present disclosure will be described in detail below.

Figure 1:
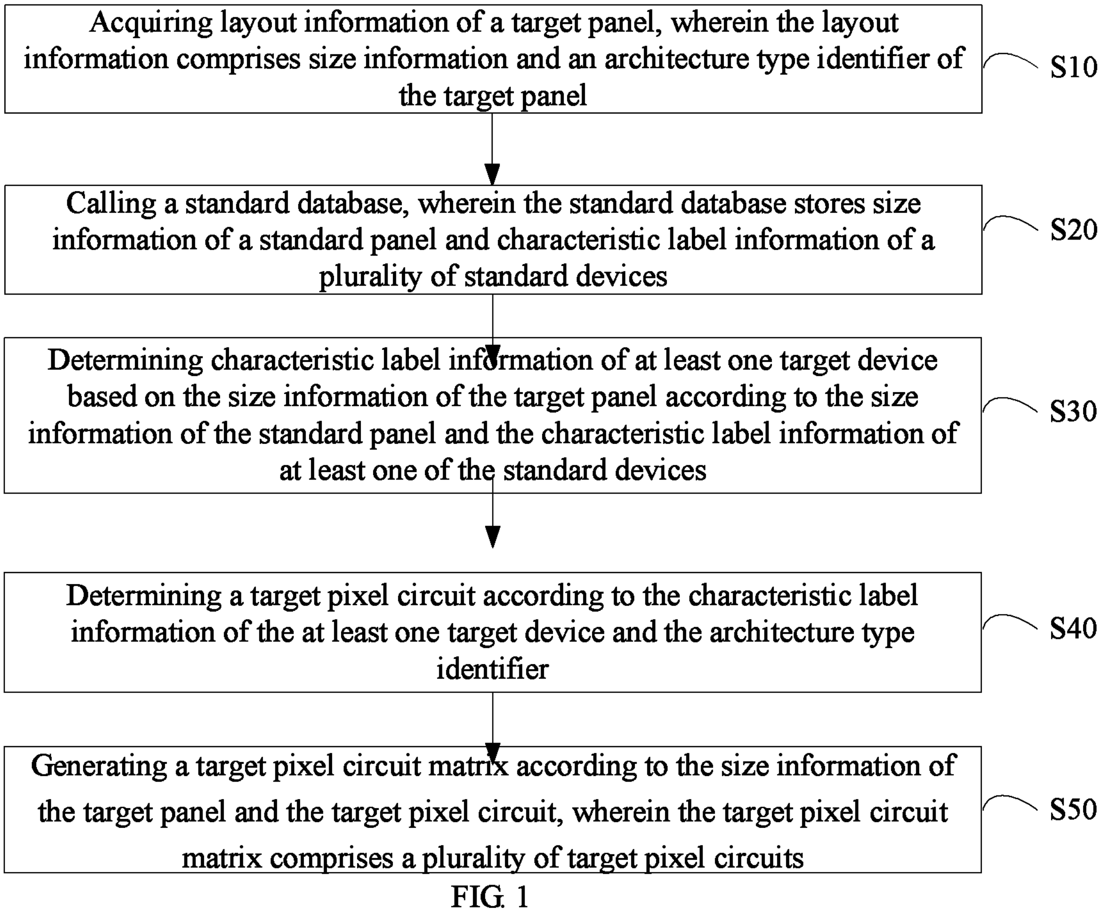
FIG. 1 is a flowchart of a first embodiment of a method for designing a pixel circuit provided by an embodiment of the present disclosure.

In an embodiment, as shown in FIG. 1, the method may comprise but is not limited to the following steps.

S10: Acquiring layout information of a target panel, wherein the layout information comprises size information and an architecture type identifier of the target panel.

Wherein, the size information of the target panel may comprise shape information and size data information of the target panel. The shape information of the target panel may be shaped as "A", and the size data information of the target panel may be shaped as "B*C", "R", "D, E" or other forms, wherein A may represent "rectangular", "circular", "sector" or other shapes, and B, C, R, D, E may all represent numbers. For example, when the target panel is rectangular, the shape information of the target panel may be "rectangular", and the size data information of the target panel may be "B*C", wherein B and C may be a length value and a width value of a rectangle, respectively. When the target panel is circular, the shape information of the target panel may be "circle", and the size data information of the target panel may be "R", wherein R may be a radius value of the circle, respectively. When the target panel is fan-shaped, the shape information of the target panel may be "fan-shaped", and the size data information of the target panel may be "D, E", wherein D and E may be a central angle and a corresponding radius value of the fan-shaped respectively.

Wherein, the architecture type identifier may be shaped as "F", wherein F may represent a circuit architecture type of the pixel circuit. It is understandable that the circuit architecture type of the pixel circuit may be, but is not limited to, architecture types such as five-transistors-one-capacitor (5T1C), two-transistors-one-capacitor (2T1C), five-transistors-two-capacitors (5T2C), and three-transistors-two-capacitors (3T2C). For example, F may be the 5T1C architecture, the 2T1C architecture, the 5T2C architecture, the 3T2C architecture or other architectures.

Wherein, the layout information of the target panel may be acquired by acquiring relevant information input from outside, or acquired by acquiring relevant information prestored in a relevant module. For example, layout information of a plurality of target panels may be stored in the relevant module in advance, and then the following operations are performed in sequence: acquiring layout information of a first target panel and performing related operations, acquiring layout information of a second target panel and performing related operations, until acquiring layout information of the last target panel and performing related operations.

S20: Calling a standard database, wherein size information of a standard panel and characteristic label information of a plurality of standard devices are stored in the standard database.

Wherein, the size information of the standard panel may refer to the relevant description of the size information of the target panel above. The standard panel may be understood as a panel of commonly used size or the standard panel may be understood as having a better design effect of a corresponding pixel circuit. It should be noted that the characteristic label information of the plurality of standard devices corresponds to the standard panel. Specifically, the plurality of standard devices may be a plurality of devices in a pixel circuit in a corresponding standard panel. The characteristic label information of each of the standard devices may comprise, but is not limited to, size information and location information of the standard device.

Further, the standard database may also store size information of a plurality of standard panels and characteristic label information of a plurality of standard devices corresponding to each of the standard panels.

S30: Determining characteristic label information of at least one target device based on the size information and the architecture type identifier of the target panel, according to the size information of the standard panel and the characteristic label information of at least one of the standard devices.

It is understandable that the architecture type identifier may indicate the circuit architecture type of the pixel circuit in the target panel. The number of devices in different circuit architecture types is different. Further, when the size information of the target panel is fixed, at least one of size and location of devices in different circuit architecture types is different. Further, the standard database stores at least the characteristic label information of the at least one of the standard devices corresponding to the architecture type identifier. According to a corresponding relationship between the size information of the standard panel and the characteristic label information of the at least one of the standard devices corresponding to the architecture type identifier, it is also possible to determine a corresponding relationship between the size information of the target panel and the characteristic label information of the at least one of the standard devices corresponding to the architecture type identifier, and then based on the size information of the target panel, characteristic label information of at least one device in the pixel circuit in the target panel can be determined as the characteristic label information of the at least one target device.

S40: Determining a target pixel circuit according to the characteristic label information of the at least one target device and the architecture type identifier.

It is understandable that the characteristic label information of the plurality of target devices corresponds to the architecture type identifier, and combined with the above discussion, it can be known that the characteristic label information of each of the target devices comprises but is not limited to size information and location information of the target device, and each architecture type identifier may comprise quantity information and layout information of the target devices, wherein the quantity information in the architecture type identifier should be the same as the number of the plurality of target devices. Specifically, the size and location of the plurality of target devices may be determined first according to the characteristic label information of the plurality of target devices to generate an initial target pixel circuit, and then the initial target pixel circuit is checked and the plurality of the target devices in the initial target pixel circuit is adjusted based on the quantity information and the layout information in the architecture type identifier to determine the target pixel circuit.

S50: Generating a target pixel circuit matrix according to the size information of the target panel and the target pixel circuit, wherein the target pixel circuit matrix comprises a plurality of target pixel circuits.

It should be noted that a plurality of the sub-pixels in the target panel may be arranged in a matrix, and each of the sub-pixels may have a corresponding target pixel circuit. Therefore, the target panel may comprise the target pixel circuit matrix. It is understandable that at least one of the size and the number of sub-pixels in panels of different sizes is different, that is, at least one of the number of target pixel circuits of the target panel and the size of the target panel is related to the size of the target panel, wherein the target pixel circuit can present the size of the target pixel circuit and the arrangement status of the plurality of target devices in the target pixel circuit. Specifically, when the size information of the target panel indicates that the size of the target panel is smaller, or when the size of the target pixel circuit is larger, or when the arrangement of the plurality of target devices in the target pixel circuit is relative compact, the number of the target pixel circuits in the target circuit matrix may be less; conversely, the number of target pixel circuits in the target pixel circuit matrix may be greater.

Figure 2:
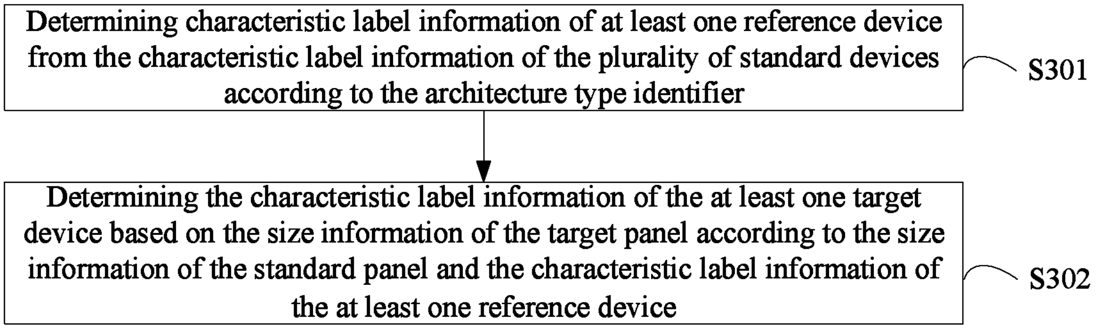
FIG. 2 is a flowchart of a second embodiment of a method for designing a pixel circuit provided by an embodiment of the present disclosure.

In an embodiment, as shown in FIG. 2, the step S40 may comprise but is not limited to the following steps.

S301: Determining characteristic label information of at least one reference device from the characteristic label information of the plurality of standard devices according to the architecture type identifier.

It is understandable that the characteristic label information of all the target devices in the target pixel circuit is related to the circuit architecture type. For example, for the pixel circuit of the target panel whose circuit architecture type is 5T2C, compared to the pixel circuit of the target panel whose circuit architecture type is 2T1C, the size of the plurality of target devices may be smaller, and vice versa. For another example, for the pixel circuit of the target panel whose circuit architecture type is 5T2C, compared with the pixel circuit of the target panel whose circuit architecture type is 2T1C, a gap between the plurality of target devices may be smaller, and vice versa.

It should be noted that the standard database may store a plurality of circuit architecture types of the pixel circuits and the characteristic label information of the at least one standard device corresponding to the circuit architecture type of each pixel circuit. Specifically, the circuit architecture type of the corresponding target panel may be determined according to the architecture type identifier. Further, the characteristic label information of the corresponding at least one standard device may be determined as the characteristic label information of the at least one reference device from the characteristic label information of the plurality of standard devices according to the circuit architecture type of the pixel circuit.

S302: Determining the characteristic label information of the at least one target device based on the size information of the target panel according to the size information of the standard panel and the characteristic label information of the at least one reference device.

It is understandable that according to the above analysis, the characteristic label information of all the target devices in the target pixel circuit corresponds to the size of the target panel. For example, the larger the size of the target panel, the larger the size of each of the plurality of target devices may be, and vice versa. For another example, the larger the size of the target panel, the larger the gap between the plurality of target devices may be, and vice versa.

Specifically, on the premise that the circuit architecture type corresponding to the pixel circuit is determined according to the architecture type identifier, the relationship between the size of the panel and the plurality of devices in the corresponding pixel circuit may be determined first according to the size information of the standard panel, the architecture type identifier, and the characteristic label information of the at least one reference device, and then combined with the size information of the target panel, and the characteristic label information of the plurality of devices in the pixel circuit of the target panel is obtained as the characteristic label information of the plurality of target devices.

Figure 3:
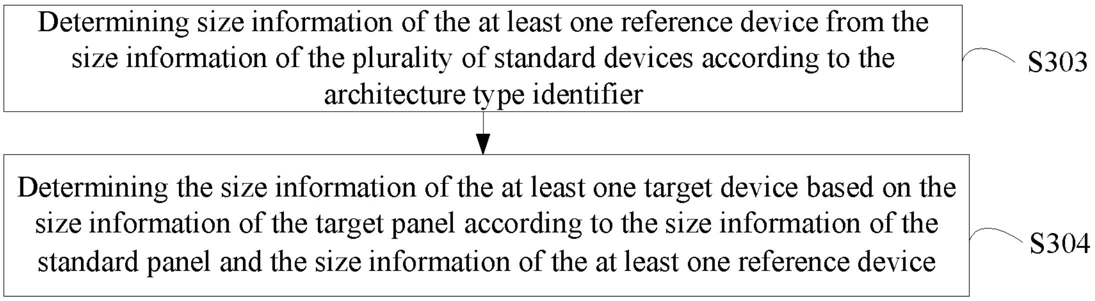
FIG. 3 is a flowchart of a third embodiment of a method for designing a pixel circuit provided by an embodiment of the present disclosure.

In an embodiment, as shown in FIG. 3, the step S30 may include but is not limited to the following steps.

S303: Determining size information of the at least one reference device from the size information of the plurality of standard devices according to the architecture type identifier.

Wherein, the characteristic label information of the standard device comprises the size information of the standard device, the characteristic label information of the target device comprises the size information of the target device, and the size information of the standard device comprises the size of the reference device, and the size information of the reference device may be used to determine the size information of the target device. In combination with the above discussion, it can be seen that the characteristic label information of the plurality of target devices in the target pixel circuit is related to the circuit architecture type of the pixel circuit in the target panel, that is, the size information of the at least one standard device corresponding to the circuit architecture type of the pixel circuit in the target panel may be selected from the size information of the plurality of standard devices as the size information of the at least one reference device, according to the architecture type identifier.

Specifically, the size information of at least one of the reference devices may comprise the size information of the plurality reference devices, and the size information of the plurality reference devices may comprise but is not limited to M1 Gate width, M2 Data width, and ITO Cst width. It can be understood that the panel comprises a plurality of gate lines arranged in parallel, a plurality of data lines arranged in parallel, and a plurality of common electrodes of the array substrate, and the plurality of gate lines and the plurality of data lines are arranged crosswise. Each of the gate lines and one of the data lines may define a corresponding pixel region, and the pixel region is used for setting the corresponding pixel circuit and the corresponding common electrode of the array substrate, and each of the common electrode of the array substrate overlaps the corresponding pixel electrode to form a storage capacitor. Wherein, the M1 Gate width may represent a width value of a gate line in the standard panel, the M2 Data width may represent a width value of a data line in the standard panel, and the ITO Cst width may represent a width value of an overlapping area corresponding to a storage capacitor in the standard panel.

S304: Determining the size information of the at least one target device based on the size information of the target panel according to the size information of the standard panel and the size information of the at least one reference device.

It can be understood that, in combination with the above discussion, the size information of the plurality of target devices in the target pixel circuit is related to the size of the target panel. For example, under a same circuit architecture type of the pixel circuit, the size and gap of the plurality of target devices may be positively correlated with the size of the corresponding target panel. Under the same circuit architecture type of the pixel circuit, the following description will be made by taking the M1 Gate width and the M2 Data width in the step S303 as an example:

$$M1\ \text{Gate width Targe}=A1+M1\ \text{Gate width}*[(\text{Size Target})/(\text{Size STD})];$$

$$M2\ \text{Data width Targe}=A2+M2\ \text{Data width}*[(\text{Size Target})/(\text{Size STD})];$$

Wherein, the Size Target and Size STD may be a length value of the target panel and a length value of the standard panel, respectively, or the Size Target and Size STD may be a width value of the target panel and a width value of the standard panel, respectively. The Size Target and Size STD may be an area value of the target panel and an area value of the standard panel, respectively. Physical meanings of the Size Target and Size STD can be adjusted according to conditions, as long as the two are related to the size of the panel and the size of the standard panel. The M1 Gate Targe and the M2 Data Targe may respectively represent a width value of a gate line and a width value of a data line in the pixel circuit in the target panel. The values indicated by A1 and A2 can also be set according to the actual situation. For example, the M1 Gate width Targe and the M2 Data width Targe have minimum values A1 and A2, respectively, and A1 and A2 can ensure that the M1 Gate width Targe and the M2 Data width Targe are too small to achieve basic functions.

Figure 4:
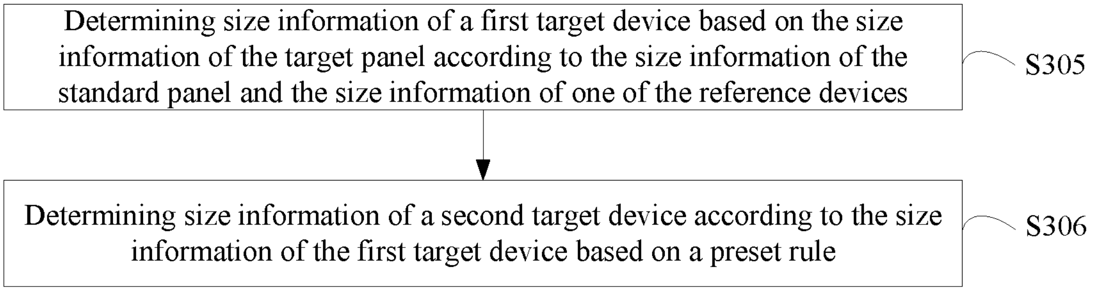
FIG. 4 is a flowchart of a fourth embodiment of a method for designing a pixel circuit provided by an embodiment of the present disclosure.

In an embodiment, as shown in FIG. 4, the step S30 may comprise, but is not limited to, the following steps.

S305: Determining size information of a first target device based on the size information of the target panel according to the size information of the standard panel and the size information of one of the reference devices.

Wherein, the target pixel circuit may comprise a plurality of target devices, and the plurality of target devices comprise at least one first target device. It should be noted that under the same circuit architecture type of the pixel circuit, the size information of each target device may be understood as comprising size values of a plurality of parts in the target device, such as a length value and a width value. That is, the size information of the first target device may comprise size values of a plurality of parts in the first target device. Specifically, the size information of the first target device may be, but is not limited to, M1 Gate width, M2 Data width, and ITO Cst width.

Specifically, reference may be made to the relevant discussion in the step S304 to determine the size value of at least one part of the first target device as the size information of the first target device. It can be understood that each sub-pixel may comprise a main pixel area and an auxiliary pixel area, and brightness of the main pixel area and brightness of the auxiliary pixel area may be controlled by main thin film transistors and auxiliary thin film transistors, respectively. Specifically, the size information of the first target device may also comprise Main TFT Width Targe, and the Main TFT Width Targe may indicate a channel width of the main thin film transistor in the target pixel circuit in the target panel. The way to determine the Main TFT Width Targe is as follows:

$$\text{Main TFT Width Targe}=\text{Main TFT Width}*[(\text{Size Target})/(\text{Size STD})];$$

Wherein, the Main TFT Width represents a channel width of a main thin film transistor in the pixel circuit in the standard panel.

S306: Determining size information of a second target device according to the size information of the first target device based on a preset rule.

Wherein, the plurality of target devices further comprise at least one second target device. Similarly, the size information of the second target device may comprise size values of at least one part of the second target device. It is understandable that a size relationship between some devices in panels of different sizes can satisfy a corresponding relationship formula. In this way, when a size of one of the target devices in the target panel is calculated, sizes of other target devices may be calculated based on the corresponding relationship formula. Wherein, the preset rule may be understood as comprising a mapping rule between the size information of the second target device and the size information of the first target device. It should be noted that the mapping rules of different parts of the first target device and the second target device may be the same or different. Specifically, the size information of the second target device may comprise a Sub TFT Width Targe, which may indicate a channel width of the auxiliary thin film transistor in the target pixel circuit in the target panel. The Sub TFT Width Targe is determined as follows:

$$\text{Sub TFT Width Targe}=A3*(\text{Main TFT Width Targe});$$

Wherein, a value indicated by A3 may also be set according to actual conditions. It is understandable that under the same circuit architecture type of the pixel circuit, the mapping rule of size values of parts of the second target device and the first target device is determined. The mapping rule at this time is the preset rule, and the preset rule may be stored in the standard database. That is, a size of a corresponding part in the second target device may be determined according to the preset rule.

Figure 5:
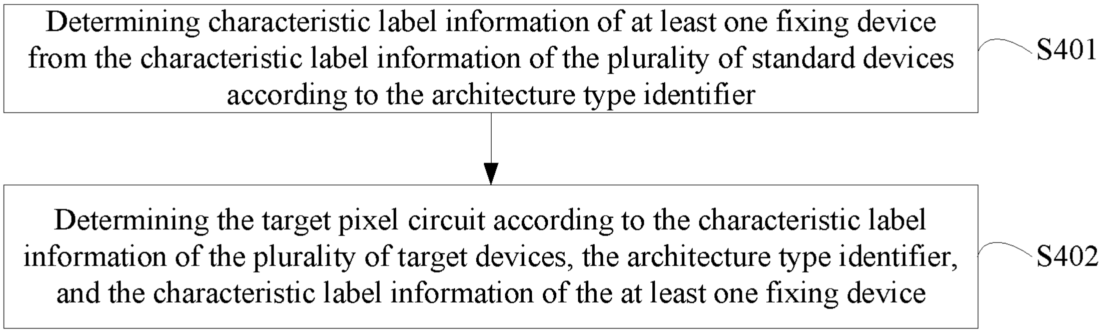
FIG. 5 is a flowchart of a fifth embodiment of a method for designing a pixel circuit provided by an embodiment of the present disclosure.

In an embodiment, as shown in FIG. 5, the step S40 may comprise but is not limited to the following steps.

S401: Determining characteristic label information of at least one fixing device from the characteristic label information of the plurality of standard devices according to the architecture type identifier.

Wherein, the plurality of target devices further comprise at least one fixing device, and the fixing device may be a part of the target devices that has nothing to do with the size information of the target panel, that is, size and location of the fixing device may not be related to the size information of the target panel, but only related to the architecture type identifier. It is understandable that under the same circuit architecture type of the pixel circuit, no matter how large the size of the target panel, the characteristic label information of the fixing device is the same, that is, the characteristic label information of the fixing device is only related to the circuit architecture type of the pixel circuit in the target panel.

It is understandable that each of the pixel regions may comprise at least one thin film transistor, and a gate and a source of the thin film transistor may be electrically connected to a corresponding gate line and a corresponding data line, respectively. It should be note that the plurality of gate lines and the plurality of common electrodes of the array substrate may be disposed on a first metal layer, and the plurality of data lines and a channel layer of the plurality of thin film transistors may be disposed on a second metal layer. Therefore, the gate and the source of the thin film transistor can be electrically connected to the corresponding gate line and the corresponding data line through corresponding via holes, respectively. Furthermore, each of the common electrodes of the array substrate in the panel may be arranged in parallel with the corresponding gate line, each pixel region further comprises a shared line, and each pixel electrode comprises a plurality of sub-pixel electrodes arranged in parallel.

Wherein, the characteristic label information of at least one of the fixing devices may include the characteristic label information of a plurality of the fixing devices. Specifically, the feature label information of the plurality of fixed devices may include, but is not limited to, M1 ACOM width, M1 ACOM to Gate space, M2 TFT channel length, Share bar width, VIA size, ITO line & space. Wherein, the M1 ACOM width may indicate a width of the common electrode of the array substrate, the M1 ACOM to Gate space may indicate a distance between the common electrode of the array substrate and the corresponding gate line, the M2 TFT channel length may indicate a channel width of the thin film transistor, the Share bar width may represent a width of the shared line, the VIA size may represent a length and width of the via hole, and the ITO line & space may represent an interval between a plurality of the sub-pixel electrodes in the pixel electrode.

S402: Determining the target pixel circuit according to the characteristic label information of the plurality of target devices, the architecture type identifier, and the characteristic label information of the at least one fixing device.

It is understandable that the plurality of target devices comprise the at least one fixing device and other target devices. According to the above analysis, size information and location information of each fixing device may be determined by the characteristic label information of the corresponding fixing device. Size information and location information of each of the other target devices may be determined by the characteristic label information of the corresponding target device. Wherein, the characteristic label information of the plurality of target devices and the characteristic label information of the plurality of fixing devices all correspond to the architecture type identifier, and each architecture type identifier may comprise the quantity information and the layout information of the target device and quantity information and layout information of the fixing devices, wherein the quantity information in the architecture type identifier should be the same as a sum of the number of the plurality of target devices and the number of the plurality of fixing devices.

Specifically, the size and location of the plurality of target devices may be determined first according to the characteristic label information of the plurality of target devices, and size and location of the at least one fixing device may be determined according to the characteristic label information of the at least one fixing device to generate the initial target pixel circuit, and then the initial target pixel circuit is checked and the plurality of target devices are adjusted based on the quantity information and layout information in the architecture type identifier to determine the target pixel circuit.

Further, after the step S40, it may also include but is not limited to the following steps: checking according to rules, determining whether the target pixel circuit is qualified; if not, adjusting at least one target structure or at least one fixing structure until the target pixel circuit is qualified.

It is understandable that in the process of determining the target pixel circuit according to the characteristic label information of the plurality of target devices and the architecture type identifier, due to the setting of parameters or the setting of rules, sizes of some parts of some target devices are not in a corresponding preset range. At this time, a size of a part whose size is not in the preset range may be adjusted, or even sizes of other parts related to an unqualified part may be adjusted until the target pixel circuit is qualified.

In order to better implement the above method, the present disclosure also provides a device for designing a pixel circuit.

Figure 6:
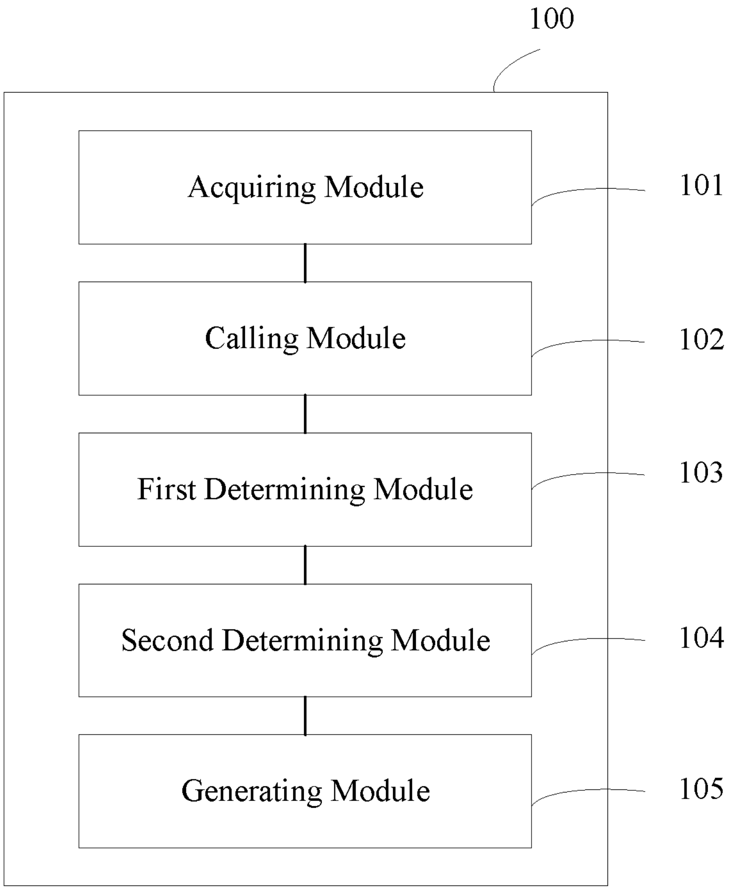
FIG. 6 is a schematic diagram of a device for designing a pixel circuit provided by an embodiment of the present disclosure.

Please refer to FIG. 6, which is a schematic structural diagram of a device 100 for designing a pixel circuit provided by an embodiment of the present disclosure. The device 100 for designing the pixel circuit of this embodiment may include, but is not limited to, the following modules.

An acquiring module 101, which is configured to acquire layout information of a target panel, wherein the layout information comprises size information and an architecture type identifier of the target panel.

Wherein, the layout information of the target panel may be acquired by acquiring relevant information input from outside through the acquiring module 101, or acquired by acquiring relevant information pre-stored in a relevant module through the acquiring module 101. For example, layout information of a plurality of target panels may be stored in the relevant module in advance, and then the acquiring module 101 performs the following operations in sequence: acquiring layout information of a first target panel and performing related operations, acquiring layout information of a second target panel and performing related operations, until acquiring layout information of the last target panel and performing related operations.

A calling module 102, which is configured to call a standard database, wherein the standard database stores size information of a standard panel and characteristic label information of a plurality of standard devices.

Further, the standard database may also store the size information of the plurality of standard panels and the characteristic label information of the plurality of standard devices corresponding to each of the standard panels. The calling module 102 may call the standard database to obtain the required information.

A second determining module 103, which is configured to determine characteristics label information of at least one target device based on the size information and the architecture type identifier of the target panel according to the size information of the standard panel and the characteristic label information of at least one of the standard device.

Further, the standard database stores at least the characteristic label information of the plurality of the standard devices corresponding to the architecture type identifier. The first determining module 103 may acquire the characteristic label information of the plurality of standard devices corresponding to the architecture type identifier. According to a corresponding relationship between the size information of the standard panel and the characteristic label information of the plurality of the standard devices corresponding to the architecture type identifier, it is also possible to determine a corresponding relationship between the size information of the target panel and the characteristic label information of the plurality of the standard devices corresponding to the architecture type identifier, and then based on the size information of the target panel, characteristic label information of plurality of devices in the pixel circuit in the target panel can be determined as the characteristic label information of the plurality of target devices.

A second determining module 104, which is configured to determine the target pixel circuit according to the characteristic label information of the at least one of target devices and the architecture type identifier.

It is understandable that the characteristic label information of the plurality of target devices corresponds to the architecture type identifier, and combined with the above discussion, it can be known that the characteristic label information of each of the target devices comprises but is not limited to size information and location information of the target device, and each architecture type identifier may comprise quantity information and layout information of the target devices, wherein the quantity information in the architecture type identifier should be the same as the number of the plurality of target devices. Specifically, the second determining module 104 may determine the size and location of the plurality of target devices first according to the characteristic label information of the plurality of target devices to generate an initial target pixel circuit, and then the initial target pixel circuit is checked and the plurality of the target devices in the initial target pixel circuit is adjusted based on the quantity information and the layout information in the architecture type identifier to determine the target pixel circuit.

A generating module 105, which is configured to generate a target pixel circuit matrix according to the size information of the target panel and the target pixel circuit, wherein the target pixel circuit matrix comprises a plurality of target pixel circuits.

It should be noted that a plurality of the sub-pixels in the target panel may be arranged in a matrix, and each of the sub-pixels may have a corresponding target pixel circuit. Therefore, the target panel may comprise the target pixel circuit matrix. It is understandable that at least one of the size and the number of sub-pixels in panels of different sizes is different, that is, at least one of the number of target pixel circuits of the target panel and the size of the target panel is related to the size of the target panel, wherein the target pixel circuit can present the size of the target pixel circuit and the arrangement status of the plurality of target devices in the target pixel circuit. Specifically, when the size information of the target panel indicates that the size of the target panel is smaller, or when the size of the target pixel circuit is larger, or when the arrangement of the plurality of target devices in the target pixel circuit is relative compact, the number of the target pixel circuits in the target circuit matrix generated by the generating module 105 may be less; conversely, the number of target pixel circuits in the target pixel circuit matrix generated by the generating module 105 may be greater.

In an embodiment, the first determining module 103 may include but is not limited to the following modules.

A first sub-determining module, which is configured to determine characteristic label information of at least one reference device from the characteristic label information of the plurality of standard devices according to the architecture type identifier.

It is understandable that the characteristic label information of the plurality of target devices in the target pixel circuit is related to the circuit architecture type of the pixel circuit in the target panel. For example, for the pixel circuit of the target panel whose circuit architecture type is 5T2C, compared to the pixel circuit of the target panel whose circuit architecture type is 2T1C, the size of the plurality of target devices determined by the first sub-determining module may be smaller, and vice versa. For another example, for the pixel circuit of the target panel whose circuit architecture type is 5T2C, compared with the pixel circuit of the target panel whose circuit architecture type is 2T1C, a gap between the plurality of target devices determined by the first sub-determining module may be smaller, and vice versa.

It should be noted that the standard database may store circuit architecture types of the plurality of pixel circuits and the characteristic label information of the at least one standard device corresponding to the circuit architecture type of each pixel circuit. That is, the first sub-determining module may determine the circuit architecture type of the pixel circuit in the target panel according to the architecture type identifier, and determine the characteristic label information of the corresponding at least one standard device as the characteristic label information of the at least one reference device from the characteristic label information of the plurality of standard devices according to the circuit architecture type of the pixel circuit in the target panel.

A second sub-determining module, which is configured to determine the characteristic label information of at least one target device based on the size information of the target panel according to the size information of the standard panel and the characteristic label information of the at least one reference device.

It is understandable that according to the above analysis, the characteristic label information of the plurality of target devices in the target pixel circuit corresponds to the size of the target panel. For example, the larger the size of the target panel, the larger the size of each of the plurality of target devices determined by the second sub-determining module may be, and vice versa. For another example, the larger the size of the target panel, the larger the gap between the plurality of target devices determined by the second sub-determining module may be, and vice versa.

Specifically, the second sub-determining module may first determine the size information of the standard panel, the architecture type identifier, and the characteristic label information of at least one of the reference devices, and determine a relationship between the size of the panel and the plurality of devices in the corresponding pixel circuit under the circuit architecture type of the corresponding pixel circuit, and obtain the characteristic label information of the plurality of devices in the pixel circuit in the target panel as the characteristic label information of the plurality of target devices according to the relationship between the size of the panel and the plurality of devices in the corresponding pixel circuit, based on the size information of the target panel.

In an embodiment, the characteristic label information of the standard device comprises the size information of the standard device, the size information of the standard device comprises the size information of the reference device, and the characteristic label information of the target device comprises the size information of the target device. The size information of the reference device is used to determine the size information of the target device. The first determining module 103 further includes but is not limited to the following modules.

A third sub-determining module, which is configured to determine the size information of the at least one reference device from the size information of the plurality of standard devices according to the architecture type identifier.

Wherein, the characteristic label information of the standard device comprises the size information of the standard device, the characteristic label information of the target device comprises the size information of the target device. In combination with the above discussion, it can be seen that the characteristic label information of the plurality of target devices in the target pixel circuit is related to the circuit architecture type of the pixel circuit in the target panel, that is, the third sub-determining module may select the size information of the at least one standard device corresponding to the circuit architecture type of the pixel circuit in the target panel from the size information of the plurality of standard devices as the size information of the at least one reference device, according to the architecture type identifier.

A fourth sub-determining module, which is configured to determine size information of the plurality of target device based on the size information and the architecture type identifier of the target panel according to the size information of the standard panel and the size information of the at least one reference device.

It can be understood that, in combination with the above discussion, the size information of the plurality of target devices in the target pixel circuit is related to the size of the target panel. For example, under the same circuit architecture type of the pixel circuit, the size and gap of the plurality of target devices may be positively correlated with the size of the corresponding target panel. Under the same circuit architecture type of the pixel circuit, the following description will be made by taking the M1 Gate width and the M2 Data width in the step S303 as an example. The fourth sub-determining module may determine the size information of the reference device according to, but not limited to:

$$M1\text{ Gate Targe}=A1+M1\text{ Gate}*[(\text{Size Target})/(\text{Size STD})];$$

$$M2\text{ Data Targe}=A2+M2\text{ Data}*[(\text{Size Target})/(\text{Size STD})];$$

Wherein, the Size Target and Size STD may be a length value of the target panel and a length value of the standard panel, respectively, or the Size Target and Size STD may be a width value of the target panel and a width value of the standard panel, respectively. The Size Target and Size STD may be an area value of the target panel and an area value of the standard panel, respectively. Physical meanings of the Size Target and Size STD can be adjusted according to conditions, as long as the two are related to the size of the panel and the size of the standard panel. The values indicated by A1 and A2 can also be set according to the actual situation. For example, the M1 Gate Targe and the M2 Data Targe have minimum values A1 and A2, respectively, and A1 and A2 can ensure that the M1 Gate Targe and the M2 Data Targe are too small to achieve basic functions.

In an embodiment, a controller and a memory are further provided.

Figure 7:
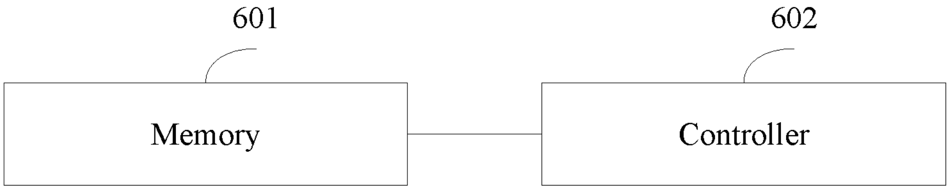
FIG. 7 is a schematic structural diagram of a controller and a memory provided by an embodiment of the present disclosure.

Please refer to FIG. 7, which is a schematic structural diagram of a controller and a memory provided by an embodiment of the present disclosure.

A memory 601 may be configured to store software programs and modules, and the memory 601 mainly comprises a program storage area and a data storage area. The controller 602 executes various functional applications and data processing by running software programs and modules stored in the memory 601.

The controller 602 executes various functions and processes data by running or executing at least one of the software programs and the modules stored in the memory 601 and calling data stored in the memory 601 to perform overall monitoring.

In some embodiments, the controller 602 acquires the layout information of the target panel, and the layout information of the target panel comprises the size information and the architecture type identifier of the target panel. The controller 602 calls the standard database, which stores the size information of the standard panel and the characteristic label information of the plurality of standard devices. The controller 602 determines the characteristic label information of the plurality of target devices based on the size information and the architecture type identifier of the target panel according to the size information of the standard panel and the characteristic label information of the at least one standard device. The controller 602 determines the target pixel circuit according to the characteristic label information of the plurality of target devices and the architecture type identifier. The controller 602 generates the target pixel circuit matrix according to the size information of the target panel and the target pixel circuit, wherein the target pixel circuit matrix comprises the plurality of target pixel circuits.

In some embodiments, the controller 602 determines the characteristic label information of the at least one reference device from the characteristic label information of the plurality of standard devices according to the architecture type identifier. The controller 602 determines the characteristic label information of the plurality of target devices based on the size information and the architecture type identifier of the target panel according to the size information of the standard panel and the characteristic label information of the at least one reference device.

In some embodiments, the controller 602 determines the size information of the at least one reference device from the plurality of standard devices according to the architecture type identifier. The controller 602 determines the size information of the plurality of target devices based on the size information and the architecture type identifier of the target panel according to the size information of the standard panel and the size information of the at least one reference device.

In some embodiments, the controller 602 determines the size information of the first target device based on the size information and the architecture type identifier of the target panel according to the size information of the standard panel and the size information of one of the reference devices. The controller 602 determines the size information of the second target device according to the size information of the first target device based on the preset rule.

In some embodiments, the controller 602 determines the characteristic label information of the at least one fixing device from the characteristic label information of the plurality of standard devices according to the architecture type identifier. The controller 602 determines the target pixel circuit according to the characteristic label information of the plurality of the target devices, the architecture type identifier, and the characteristic label information of the at least one fixing device.

It should be noted that those of ordinary skill in the art can understand that all or part of the steps in the various methods of the above-mentioned embodiments can be completed by programs instructing relevant hardware, and the program can be stored in a computer-readable storage medium, such as stored in a memory of an electronic device and executed by at least one processor in the electronic device. The process of execution may include a flow of an embodiments of a charging reminding method. Wherein, the storage medium may comprise: Read Only Memory (ROM), Random Access Memory (RAM), magnetic disks, optical disks, or the like.

The present disclosure provides a method and a device for designing a pixel circuit, a controller, and a storage medium. The method for designing the pixel circuit comprises: acquiring the layout information of the target panel, wherein the layout panel of the target panel comprises the size information and the architecture type identifier of the target panel; calling the standard database, wherein the standard database stores the size information of the standard panel and the characteristic label information of the plurality of standard devices; determining the characteristic label information of the plurality of target devices based on the size information and architecture type identifier of the target panel according to the size information of the standard panel and the characteristic label information of the at least one standard device; determining the target pixel circuit according to the characteristic label information of the plurality of target devices and the architecture type identifier; and generating the pixel circuit matrix according to the size information of the target panel and the target pixel circuit, wherein the target pixel circuit matrix comprises the plurality of target pixel circuits. This method can call the size information of the standard panel and the characteristic label information of the at least one standard device in the standard database according to the layout information of the target panel, and determine the characteristic label information of the plurality of target devices based on the size information of the target panel and the architecture type identifier to determine the target pixel circuit, which prevents acquiring information such as the size information and the location information of all devices in the target pixel circuit of the target panel to determine the target pixel circuit, and also prevents manually inputting data to determine the target pixel circuit. Rather, the target pixel circuit is determined directly based on the layout information of the target panel and the relevant information in the standard database, which improves the drawing efficiency of the pixel circuit of the display panel.

The method and device for designing the pixel method, the controller, and the storage medium provided by the embodiments of the present disclosure are described in detail above. Each functional module can be integrated in a processing chip, or can exist separately and physically, or two or more modules can be integrated in one module. The above-mentioned integrated modules can be implemented in the form of hardware or software functional modules. In the present disclosure, specific examples are used to describe the principles and implementation of the present disclosure. The description of the above embodiments is only used to help understand the technical solutions and core ideas of the present disclosure; at the same time, for those skilled in the art, according to the ideas of the present disclosure, specific implementations and application scopes will have changes. In summary, the content of this specification should not be construed as limiting the present disclosure.

What is claimed is:

1. A method for designing a pixel circuit, which comprises:

acquiring layout information of a target panel, wherein the layout information comprises size information and an architecture type identifier of the target panel;

calling a standard database, wherein the standard database stores size information of a standard panel and characteristic label information of a plurality of standard devices;

determining characteristic label information of at least one target device based on the size information of the target panel according to the size information of the standard panel and the characteristic label information of at least one of the standard devices;

determining a target pixel circuit according to the characteristic label information of the at least one target device and the architecture type identifier; and generating a target pixel circuit matrix according to the size information of the target panel and the target pixel circuit, wherein the target pixel circuit matrix comprises a plurality of the target pixel circuits.

2. The method for designing the pixel circuit according to claim 1, wherein the step of determining the characteristic label information of the at least one target device based on the size information of the target panel according to the size information of the standard panel and the characteristic label information of the at least one of the standard devices comprises:

determining characteristic label information of at least one reference device from the characteristic label information of the plurality of standard devices according to the architecture type identifier; and determining the characteristic label information of the at least one target device based on the size information of the target panel according to the size information of the standard panel and the characteristic label information of the at least one reference device.

3. The method for designing the pixel circuit according to claim 2, wherein the characteristic label information of the standard devices comprises size information of the standard devices, the size information of the standard devices comprises size information of the reference device, the characteristic label information of the target device comprises size information of the target device, and the size information of the reference device is configured to determine the size information of the target device.

4. The method for designing the pixel circuit according to claim 3, wherein size information of a plurality of reference devices comprises M1 Gate width, M2 Data width, and ITO Cst width;

wherein a pixel circuit of the standard panel comprises a plurality of gate lines arranged in parallel, a plurality of data lines arranged in parallel, and a plurality of common electrodes of an array substrate, the plurality of gate lines and the plurality of data lines cross each other to define a plurality of pixel regions, and each of the pixel regions is used to set a corresponding pixel circuit and a corresponding common electrode of the array substrate, and each common electrode of the array substrate overlaps a corresponding pixel electrode to form a storage capacitor, wherein the M1 Gate width is a width value of the gate lines, the M2 Data width is a width value of the data lines, and the ITO Cst width is a width value of an overlapping area corresponding to the storage capacitor.

5. The method for designing the pixel circuit according to claim 3, wherein the target pixel circuit comprises a plurality of the target devices, and the plurality of target devices comprise a first target device and a second target device; and the step of determining the characteristic label information of the at least one target device based on the size information and the architecture type identifier of the target panel according to the size information of the standard panel and the characteristic label information of the at least one of the standard devices comprises:

determining size information of the first target device based on the size information of the target panel according to the size information of the standard panel and the size information of one reference device; and determining size information of the second target device according to the size information of the first target device based on a preset rule.

6. The method for designing the pixel circuit according to claim 5, wherein in the second target device and the first target device, preset rules of size information of different parts are the same or different.

7. The method for designing the pixel circuit according to claim 1, wherein the target pixel circuit further comprises at least one fixing device, and the step of determining the target pixel circuit according to the characteristic label information of the at least one target device and the architecture type identifier comprises:

determining characteristic label information of the at least one fixing device from the characteristic label information of the plurality of standard devices according to the architecture type identifier; and determining the target pixel circuit according to the characteristic label information of the at least one target device the architecture type identifier, and the characteristic label information of the at least one fixing device.

8. The method for designing the pixel circuit according to claim 7, wherein the characteristic label information of the at least one fixing device comprises M1 ACOM width, M1 ACOM to Gate space, M2 TFT channel length, Share bar width, VIA size, and ITO line & space;

wherein a pixel circuit of the standard panel comprises a plurality of gate lines arranged in parallel, a plurality of data lines arranged in parallel, and a plurality of common electrodes of an array substrate, the plurality of gate lines and the plurality of data lines cross each other to define a plurality of pixel regions, each of the pixel regions is used to provide a corresponding pixel circuit and a corresponding common electrode of the array substrate, each of the pixel regions may comprise at least one thin film transistor, and each of the common electrodes of the array substrate and a corresponding pixel electrode overlap to form a storage capacitor, wherein the M1 ACOM width is a width of the common electrodes of the array substrate, the M1 ACOM to Gate space is an interval between the common electrodes of the array substrate and a corresponding gate line, the M2 TFT channel length is a channel width of the thin film transistor, the Share bar width is a width of a shared line, the VIA size is a length and width of a via hole, and the ITO line & space is an interval between a plurality of sub-pixel electrodes in the pixel electrode.

9. A device for designing a pixel circuit, which comprises:

an acquiring module configured to acquire layout information of a target panel, wherein the layout information comprises size information and an architecture type identifier of the target panel;

a calling module configured to call a standard database, wherein the standard database stores size information of a standard panel and characteristic label information of a plurality of standard devices;

a first determining module configured to determine characteristic label information of at least one target device based on the size information and the architecture type identifier of the target panel according to the size information of the standard panel and the characteristic label information of at least one of the standard devices;

a second determining module configured to determine a target pixel circuit according to the characteristic label information of the at least one target device and the architecture type identifier; and a generating module configured to generate a target pixel circuit matrix according to the size information of the target panel and the target pixel circuit, wherein the target pixel circuit matrix comprises a plurality of the target pixel circuits.

10. The device for designing the pixel circuit according to claim 9, wherein the first determining module comprises:

a first sub-determining module configured to determine characteristic label information of at least one reference device from the characteristic label information of the plurality of standard devices according to the architecture type identifier; and a second sub-determining module configured to determine the characteristic label information of the at least one target device based on the size information of the target panel according to the size information of the standard panel and the characteristic label information of the at least one reference device.

11. The device for designing the pixel circuit according to claim 10, wherein the characteristic label information of the standard devices comprises size information of the standard devices, and the size information of the standard devices comprises a size information of the reference device, the characteristic label information of the target device comprises size information of the target device, and the size information of the reference device is used to determine the size information of the target device, and wherein the first determining module further comprises:

a third sub-determining module configured to determine the size information of the at least one reference device from the size information of the plurality of standard devices according to the architecture type identifier; and a fourth sub-determining module configured to determine the size information of the at least one target device based on the size information and the architecture identifier of the target panel according to the size information of the standard panel and the size information of the at least one reference device.

12. A controller, wherein the controller is configured to execute a number of instructions stored in a memory to implement a method for designing a pixel circuit, and the method comprises:

acquiring layout information of a target panel, wherein the layout information comprises size information and an architecture type identifier of the target panel;

calling a standard database, wherein the standard database stores size information of a standard panel and characteristic label information of a plurality of standard devices;

determining characteristic label information of at least one target device based on the size information of the target panel according to the size information of the standard panel and the characteristic label information of at least one of the standard devices;

determining a target pixel circuit according to the characteristic label information of the at least one target device and the architecture type identifier; and generating a target pixel circuit matrix according to the size information of the target panel and the target pixel circuit, wherein the target pixel circuit matrix comprises a plurality of the target pixel circuits.

13. The controller according to claim 12, wherein the step of determining the characteristic label information of the at least one target device based on the size information of the target panel according to the size information of the standard panel and the characteristic label information of the at least one of the standard devices comprises:

determining characteristic label information of at least one reference device from the characteristic label information of the plurality of standard devices according to the architecture type identifier; and determining the characteristic label information of the at least one target device based on the size information of the target panel according to the size information of the standard panel and the characteristic label information of the at least one reference device.

14. The controller according to claim 13, wherein the characteristic label information of the standard devices comprises size information of the standard devices, the size information of the standard devices comprises size information of the reference device, the characteristic label information of the target device comprises size information of the target device, and the size information of the reference device is configured to determine the size information of the target device.

15. The controller according to claim 14, wherein the target pixel circuit comprises a plurality of the target devices, and the plurality of target devices comprise a first target device and a second target device; and the step of determining the characteristic label information of the at least one target device based on the size information and the architecture type identifier of the target panel according to the size information of the standard panel and the characteristic label information of the at least one of the standard devices comprises:

determining size information of the first target device based on the size information of the target panel according to the size information of the standard panel and the size information of one reference device; and determining size information of the second target device according to the size information of the first target device based on a preset rule.

* * * * *